3,335,113
PROCESS FOR PREPARING POLYMETHYLOL UREAS
John P. Dundon, Branchburg Township, Somerset County, N.J., assignor to American Cyanamid Company, Stamford, Conn., a corporation of Maine
No Drawing. Filed Dec. 6, 1962, Ser. No. 242,606
4 Claims. (Cl. 260—69)

This invention relates to urea formaldehyde condensates having a relatively high mol ratio of combined formaldehyde per mol of urea. More particularly, this invention relates to water-soluble stable urea formaldehyde condensates having a relatively high mol ratio of combined formaldehyde per mol of urea, their process of preparation and their use in textile finishing.

The manufacture of urea-formaldehyde condensates, which term includes their etherified derivatives in general is an old and well established art as is their use for various purposes, including textile finishing. For the most part, this technology has been concerned with the preparation of products which may be characterized as mono- or dimethylol ureas and their etherified derivatives, which are either water-soluble or solvent-soluble products. In general, such products may be characterized as having a combined formaldehyde to urea mol ratio of up to about 2 to 1.

Dimethylol urea is a well known textile finishing agent for imparting durable wrinkle recovery and shrinkage control on cellulosic textile materials. Dimethylol urea does, however, suffer certain serious deficiencies. These include relatively low solubility in water and relatively poor stability.

Urea formaldehyde condensates having a high ratio of mols of combined formaldehyde per mol of urea, i.e., highly methylolated ureas, could for certain uses or purposes have many advantages over a dimethylol urea because of the increased functionality of the individual molecules. One such usage would be textile finishing where, because of the occurrence of more reactive sites on the urea a higher degree of reactivity with the textile fiber could result.

While in general terms there are suggestions in the prior art that highly methylolated ureas such as tetramethylol urea have been prepared, it does not appear that a feasible or successful process for making such highly methylolated ureas which are in themselves useful as textile finishing agents has been known prior to the present invention.

It is, therefore, a principal object of this invention to provide a water-soluble stable urea formaldehyde condensate composition characterized by a high ratio of combined formaldehyde per mol of urea, i.e. a highly methylolated urea.

It is a further object of this invention to provide a process for preparing a water-soluble stable urea formaldehyde condensate containing composition characterized by a high ratio of combined formaldehyde per mol or urea, i.e. a composition containing a highly methylolated urea.

Another object of this invention is to provide a process for treating cellulose-containing textile materials with such a novel water-soluble stable urea formaldehyde condensate containing composition.

These and other objects and advantages of the present invention will become more apparent from the detailed description thereof set forth hereinbelow.

In accordance with the present invention a process is provided for preparing a water-soluble stable urea formaldehyde condensation product which comprises reacting relative amounts of 1 mol of urea with from between 4 and 5 mols of formaldehyde at a pH above 10 and in the presence of an amount of alkali that does not exceed .1 mol of sodium hydroxide per mol of urea and at a temperature of between 40 and 100° C. This reaction is carried out until the mols of combined formaldehyde per mol of urea is from about 3.4 to about 3.8 and the formaldehyde content of the reaction mixture is below 4%.

In preparing the highly methylolated urea composition of this invention, relative amounts of 1 mol of urea are reacted with between 4 and 5 mols of formaldehyde and preferably with from between from about 4.2 and about 4.6 mols of formaldehyde. Amounts of formaldehyde in excess of 4.6 mols are inadvisable because of the resulting large amounts of unreacted formaldehyde remaining in the composition.

The reaction is preferably carried out in water as a solvent and the formaldehyde may be used as the commercial 37% or 44% formaldehyde solutions or as paraformaldehyde.

The principal reaction between urea and formaldehyde in an aqueous medium is carried out at a pH above 10 and in the presence of an amount of alkali that does not exceed the equivalent of 0.1 mol of sodium hydroxide per mol of urea. As examples of strong alkalis, sodium hydroxide, potassium hydroxide, lithium hydroxide, suitable alkaline earth metal hydroxides such as barium hydroxide may be cited. These alkaline materials or their equivalents are employed in amounts that are equivalent to an alkalinity of about pH 10 and above but should not be employed in an amount that exceeds 0.1 mol of sodium hydroxide or its equivalent per mol of urea. At pH's appreciably below 10 the rate of reaction between urea and formaldehyde is slow and the desired degree of methylolation to be discussed more fully hereinafter, is not obtainable. In addition, because of the well-known Canizzaro's reaction, that is the reaction between sodium hydroxide and formaldehyde in which caustic soda is consumed and sodium formate is formed, it is necessary to add to the caustic soda throughout the reaction period in order to maintain the pH at a value of at least 10 while employing the caustic soda or its equivalent in an amount not exceeding 0.1 mol of sodium hydroxide or its equivalent per mol of urea. It should be noted that if amounts of caustic soda or its equivalent significantly in excess of 0.1 mol per mol of urea is employed in the preparation of a highly methylolated urea, undesirably large amounts of sodium formate are found to be present in the finished product which interferes with the textile finishing properties of the resulting product. The sodium formate appears to buffer the acidic catalyst normally employed to cure aminoplasts by the textile finishing industry.

The reaction between urea and formaldehyde is carried out until the mols of combined formaldehyde per mol of urea ratio is at least 3.4:1 and preferably is a value of between 3.6 and 3.8:1 as determined by analyses of unreacted formaldehyde.

In the carrying out of the present process it has been found convenient to carry out the reaction in two stages. In the first stage urea and formaldehyde are reacted until the amount of free formaldehyde constitutes from 4 to about 8% of the reaction mixture while this excess free formaldehyde may be removed by distillation, in accordance with the important and preferred aspect of this invention the pH of the reaction mixture is adjusted to a value of below 8.5 but above 7 and urea in an amount of from between 0.2 mols and 1 mol per mol of initial urea is added to the reaction mixture. Methylolation of the additional urea is then carried out until the unreacted or free formaldehyde content of the reaction mixture is less than 4% and preferably less than 3% by weight of the reaction mixture.

It has been determined that if the pH is not adjusted to a value of below 8.5 but above 7, prior to the second addition of urea, undesirable side reactions occur which appear to result in the formation of polymeric materials which are detrimental to the stability of the final product. As indicated above the amount of additional urea is from about 0.2 to about 1 mol relative to the initial mol of urea but is added in an amount sufficient to reduce the free formaldehyde content to a value of less than 4% and preferably less than 3% based on the total weight of the reaction mixture.

In accordance with the present process the methylolation is carried out at a temperature of from between 40 and 100° C. and preferably at a temperature from between 60 and 80° C. In accordance with the above described two-stage methylolation in which the pH is adjusted downwardly prior to the second addition of urea, this adjustment can be conveniently accomplished in accordance with the present invention by raising the temperature of the reaction mixture to a value of about 90° C. which accelerates the Cannizzaro reaction between the formaldehyde and caustic soda resulting in a lowering of the pH to a value of between 7 and about 8.5.

Typical compositions of products of this invention may be characterized as containing 1 mol of a polymethylol urea, having between 3.6 and 3.8 mols of combined formaldehyde, about 0.1 to about 0.3% of dimethylol urea and about 0.2 to about 0.4 mols of free formaldehyde.

A typical final product of this invention may be characterized as containing 1 mol of a polymethylol urea having between 3.6 and 3.8 mols of combined formaldehyde, about 0.2 mols of dimethylol urea and about 0.3 mols of free formaldehyde plus water and minor amounts of dissolved salts.

The typical products will be water-white liquids having a pH of between 7 and 8.5. As stated above, the formaldehyde should be less than 4% and preferably less than 3% of the weight of the product. The product is storage stable at temperatures of −10° C. up to 50° C. for several months. Pad baths containing the product are stable and are readily dilutable with water in all proportions. None of the products of this invention have been found to be incompatible with other thermo-setting reactants and with various auxiliary agents employed in textile finishing.

The products of this invention are useful in imparting wrinkle recovery and shrinkage control to cellulosic textile materials and as such may be applied to such materials by any of the conventional procedures known in the textile industry. Thus they may be applied by padding, dipping, spraying, immersing and the like. Regardless of the method of application, amounts of between 2 and about 20%, and preferably between about 4 and 12%, of resin solids are applied to the material based on its dry weight.

After application of the highly methylolated urea composition the treated fabric is dried and cured to impart wrinkle resistance and shrinkage control thereto. Normally curing is effected by means of a curing catalyst or accelerator which may be free acids, acid salts, alkanolamine salts, metal salts and the like. The concentration of catalyst employed may range from about 0.1 to about 35% or higher based upon the weight of resin solids. Of the types of catalysts identified above the preferred catalyst is zinc nitrate which when used in larger amounts than normal, as for example from 6 to about 30% and preferably in amounts from between about 10 to 20% based on the resin solids, produces a superior finish. The following are illustrative of other catalysts which may be employed: free acids such as phosphoric, lactic, tartaric, oxalic acids; acid salts such as ammonium chloride; amine salts such as alkanolamine salts like diethanolamine hydrochloride; metal salts such as magnesium chloride, zinc chloride, aluminum chloride and the like.

Following the application of the reactants and curing accelerator to the cellulosic textile material, the material is normally subjected to drying and curing operations to effect the desirable wash and wear properties of crease-resistance and shrinkage control. The drying and curing operation may be carried out in a single step or in separate steps. The temperature at which the drying and curing operations are effected can vary widely and are influenced to some extent by the type of catalyst employed. Normally the range of temperature extends from about 180° F. to about 450° F. or even higher. Generally speaking the time of the drying and/or curing operation is inversely proportional to the temperature employed and of course is influenced by whether or not separate or combined drying and curing steps are employed.

Generally when drying and curing is carried out as a combined operation in time, from about 1 minute to about 10 minutes may be employed at temperatures of from about 450 to 250° F. respectively. When the fabric has been dried preliminary to curing, curing times on the order of 5 minutes to about ¼ minute at a temperature from between 250 and 450° F. respectively may be employed.

It should be noted that by the expression "cellulose-containing textile material" and similar expressions as they are employed herein, it is meant fibers, yarns, filaments, formed fabrics, whether knitted, woven, non-woven, felted or otherwise formed, which contain at least 50% of cellulosic fibers as for example cotton, viscose rayon, linen, flax, jute, ramie and the like. These cellulosic textile materials may be employed in combinations with other known textile materials as for example they may be blended with other natural or synthetic fibers as for example silk, wool, the acrylic and polyester fibers, the nylons and the like.

In order that the present invention may be more fully understood, the following examples are given primarily by way of illustration. No specific details or enumerations contained therein should be construed as limitations on the present invention except insofar as they appear in the appended claims. All parts and percentages are by weight unless otherwise specifically designated.

*Example 1*

To a mixture of 300 parts of 44% formalin (4.4 moles of formaldehyde) of pH 6.5–7.5 and about 1.5 parts of 50% caustic soda there was added at pH 10.0 or above, 60 parts (1.0 mole) of urea. The temperature of the reaction mixture was maintained at 70° C. for 2 hours while the pH was kept at 10.0 or above by additions of 50% caustic soda, about 3 parts additional (1.5 parts after 20 minutes and 1.5 parts after 40 minutes). The total caustic soda to urea mole ratio was 0.056:1.0. The reaction mixture contained about 6.4% free formaldehyde (0.77 mole) corresponding to about 3.6 moles of combined formaldehyde per mole of urea. The temperature was raised to 90° C. and held there for about 15 minutes, whereupon the pH of the reaction mixture dropped below 8.1. 14.6 parts (0.24 mole) of urea was added and the reaction was continued at 90° C. for about 0.5 hour, followed by cooling to a temperature below 40° C. The reaction product contained about 3.0% (0.37 mole) of free formaldehyde and 50% resin solids.

It had a pH of about 7.2 and was stable at temperatures of −10° C., 12°, 37°, and 50° C. for over one month.

*Example 2*

A pad bath was prepared containing 10% of the product of Example 1 (5% resin solids) and 10% of zinc nitrate based on the resin solids. The pad bath was applied to rayon gabardine by the usual padding procedure depositing 4% resin solids on the fabric. The fabric was then dried for 7 minutes at 225° F. and cured by heating for 3 minutes at 300° F.

The untreated and treated percale fabrics were tested for wrinkle recovery and the gabardine fabrics for shrinkage control after a series of launderings.

The wrinkle recovery tests were made by tentative test method 66–1959T, 1961 Technical Manual of the American Association of Textile Chemists and Colorists, vol. 37, p. 155.

The shrinkage of the fabrics was measured by tentative test method 96–1960T, above reference, p. 121, after 1, 5 and 10 washes. The washes were carried out in an automatic washer using a 0.1% solution of neutral soap at 140° F.

The results of the tests are shown in Table I.

TABLE I

| Fabric | Rayon Gabardine Percent Shrinkage | | | | | | Cotton Percale Wrinkle Recovery Degrees, total W plus F |
|---|---|---|---|---|---|---|---|
| | 1 wash | | 5 washes | | 10 washes | | |
| | W | F | W | F | W | F | |
| Untreated | 16.6 | 3.0 | 22.2 | 4.3 | 22.6 | 5.3 | 170 |
| Treated | 7.6 | 3.3 | 10.6 | 0.3 | 12.0 | 1.6 | 275 |

*Example 3*

Pad baths were prepared containing 10% or 5% of the product of Example 1 (5% or 2.5% resin solids, respectively) and 10%, 13.3%, 16.7% or 20% of zinc nitrate based on the resin solids, as indicated in Table II. The pad baths were applied to rayon gabardine and cotton knit fabrics by the usual padding procedures depositing 4% or 2% resin solids on the fabrics, as shown in Table II. The fabrics were dried for 2 minutes at 225° C. and then cured by heating for 3 minutes at 300° F.

The untreated and treated fabrics were tested for shrinkage control after a series of 5 washes in 140° F. water containing 0.1% neutral soap.

The results of the tests are shown in Table II.

TABLE II

| Percent Resin Solids in Pad Bath | Percent Resin Solids on Fabric | Percent Catalyst on Resin Solids | Percent Shrinkage | | | |
|---|---|---|---|---|---|---|
| | | | Rayon Gab. | | Cotton Knit | |
| | | | W | F | W | F |
| 5 | 4 | 10.0 | 11 | 1 | 10 | 2 |
| 5 | 4 | 13.3 | 7 | 1 | 6 | 2 |
| 5 | 4 | 16.7 | 7 | 0 | 5 | 0 |
| 5 | 4 | 20.0 | 5 | 1 | 7 | 0 |
| 2.5 | 2 | 20.0 | 13 | 0 | 8 | 4 |
| Untreated Fabric | | | 22 | 2 | 21 | 5 |

*Example 4*

Pad baths of the following compositions were prepared:

(A) 9% of water repellent containing methylol stearamide and tris(methoxymethyl)melamine; 5% of the product of Example 1 (2.5% resin solids), 1% of ammonium sulfate (B) 9% of water repellent containing methylol stearamide and tris(methoxymethyl)melamine; 9% (5.4% resin solids) of a 1:2 mixture of monomethylolurea and dimethylolurea, 1% of ammonium sulfate.

Applications of the pad baths were made on cotton poplin and on a viscose rayon/acetate gabardine by standard padding procedures. The cotton poplin was cured by heating at 350° F. for 1.5 minutes; the rayon gabardine at 300° F. for 3 minutes.

The treated fabrics were tested for wrinkle recovery and for water-repellency properties before and after a series of launderings.

The wrinkle recovery tests were made as described in Example 2.

The water-repellency tests were made before and after 3 washes in water at 145° F. in the cases of the cotton poplin, and at 106° F. for the rayon gabardine. The spray rating tests were made by the procedures of Standard Test Method 22–1961, previous reference, p. 152. The repellency is noted as follows:

Rating:                  Appearance of fabric
100 _____ No wetting of upper surface
90 _____ Slight wetting of upper surface
80 _____ Wetting of upper surface at spray points The results are shown in Table III.

TABLE III

| Treatment | Cotton Poplin | | | Viscose/Acetate Gabardine | | |
|---|---|---|---|---|---|---|
| | Spray Rating | | Wrinkle Recovery | Spray Rating | | Wrinkle Recovery |
| | Initial | Washed | Degrees, Total | Initial | Washed | Degrees, Total |
| Pad Bath A | 100 | 80 | 224 | 100 | 100 | 295 |
| Pad Bath B | 100 | 80 | 228 | 100 | 100 | 303 |

This example shows the highly methylolated product of this invention is approximately twice as effective as the commercial methylolurea composition in the above test.

Other textile finishing resins or agents either thermosetting or thermoplastic may be employed with the compositions of this invention to improve the durability of such finishes or to modify the hand or other characteristics thereof. In addition, of course, softeners, lubricants and other conventional textile treating agents and auxiliaries may be employed with the compositions of this invention.

What is claimed is:

1. A process for preparing a water-soluble stable urea-formaldehyde condensation product which comprises reacting relative amounts of one mole of urea with from 4.2 to 4.6 moles of formaldehyde at a pH above 10 in the presence of an amount of alkali that does not exceed the equivalent of .1 mole sodium hydroxide per mole of urea, and a temperature of from 60 to 80° C. until the moles of combined formaldehyde per mole of urea are from about 3.6 to about 3.8, adjusting the pH of the reaction mixture to from 7 to about 8.5, adding urea in an amount up to 0.3 mole per mole of initial urea to react with free formaldehyde present and thereby reduce the free formaldehyde content below 3%.

2. A process for preparing a water-soluble stable urea-formaldehyde condensation product which comprises reacting relative amounts of 1 mole of urea with from 4.2 to 4.6 moles of formaldehyde at a pH above 10 in the presence of an amount of alkali that does not exceed the equivalent of .1 mole sodium hydroxide per mole of urea, and a temperature of from 60 to 80° C. until the moles of combined formaldehyde per mole of urea are from about 3.6 to about 3.8, adjusting the pH of the reaction mixture to from 7 to about 8.5 by heating the reaction mixture, thereby consuming alkali, adding urea in an amount up 0.2 mole per mole of initial urea to react with free formaldehyde present, and thereby reduce the free formaldehyde content to below 3%.

3. A process for preparing a water-soluble stable urea-formaldehyde condensation product which comprises reacting relative amounts of one mole of urea with from between 4 and 5 moles of formaldehyde at a pH above 10 in the presence of an amount of alkali that does not exceed the equivalent of .1 mole sodium hydroxide per mole of urea, and a temperature between 40 and 100° C. until the moles of combined formaldehyde per mole of urea are from about 3.4 to about 3.8, adjusting the pH of the reaction mixture to from 7 to about 8.5, adding urea in an amount of up to 0.3 mole per mole of initial urea to react the free formaldehyde present and thereby reduce the free formaldehyde content of the reaction mixture to below 3%.

4. A process for preparing a water-soluble stable urea-formaldehyde condensation product which comprises reacting relative amounts of one mole of urea with from 4.2 to 4.6 moles of formaldehyde at a pH above 10 in the presence of an amount of sodium hydroxide that does not exceed the equivalent of .1 mole sodium hydroxide per mole of urea and a temperature from 60 to 80° C. until the moles of combined formaldehyde per mole of urea are from about 3.6 to about 3.8, adjusting the pH of the reaction mixture to from 7 to 8.5 by heating the reaction mixture at an elevated temperature of up to 100° C., thereby consuming the sodium hydroxide, adding urea in an amount up to 0.2 mole per mole of initial urea to react with free formaldehyde present, and thereby reduce the free formaldehyde content to below 3%.

References Cited

UNITED STATES PATENTS

| | | | |
|---|---|---|---|
| Re. 23,174 | 11/1949 | Kvalnes | 260—69 |
| 2,485,203 | 10/1949 | Kvalnes et al. | 260—69 |
| 3,067,062 | 12/1962 | Etzel | 117—143 |

WILLIAM H. SHORT, *Primary Examiner.*

N. S. RIZZO, *Examiner.*

H. R. JILES, H. E. SCHAIN, *Assistant Examiners.*

UNITED STATES PATENT OFFICE
CERTIFICATE OF CORRECTION

Patent No. 3,335,113 August 8, 1967

John P. Dundon

It is hereby certified that error appears in the above numbered patent requiring correction and that the said Letters Patent should read as corrected below.

Column 6, line 68, and column 7, lines 5 and 19, after "reacting", each occurrence, insert -- while maintaining the pH of the reaction medium above 10 --; column 6, line 69, and column 7, lines 6 and 20, strike out "at a pH above 10"; column 8, line 6, for "at a pH above 10" read -- while maintaining the pH of the reaction medium above 10 by the continuous addition of sodium hydroxide --.

Signed and sealed this 7th day of January 1969.

(SEAL)
Attest:

Edward M. Fletcher, Jr.
Attesting Officer

EDWARD J. BRENNER
Commissioner of Patents